May 9, 1961  L. A. RUNTON  2,983,561
MOLDED ANTI-FRICTION BEARING
Filed Feb. 20, 1958
Fig. 1.
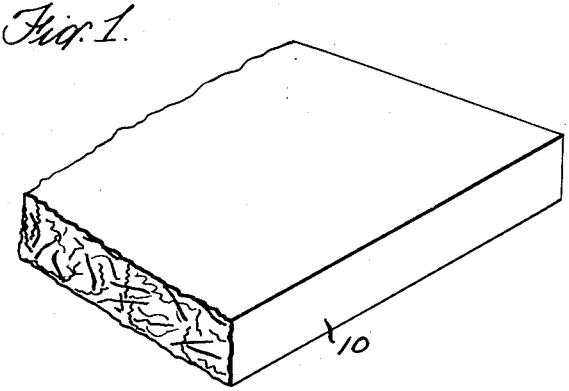
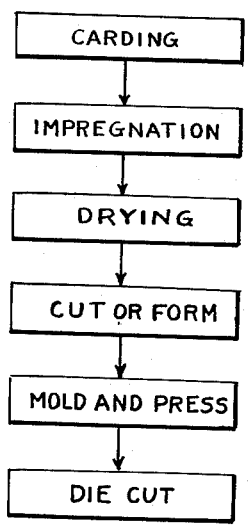
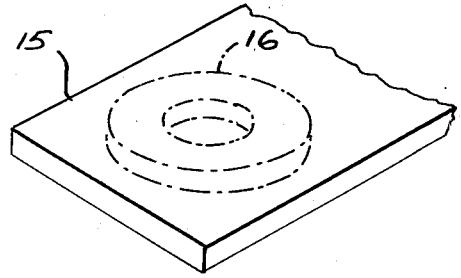
Fig. 2.
Fig. 3.
INVENTOR
LESLIE A. RUNTON
BY
ATTORNEY Уnited States Patent Office 2,983,561
Patented May 9, 1961

2,983,561

MOLDED ANTI-FRICTION BEARING

Leslie A. Runton, Middle Haddam, Conn., assignor to The Russell Manufacturing Company, Middletown, Conn., a corporation of Connecticut Filed Feb. 20, 1958, Ser. No. 716,459

1 Claim. (Cl. 308—238)

This invention relates to anti-friction bearing elements and more particularly to a molded resin bearing having low friction fibers exposed to form the bearing surface.

An object is to provide a bearing element of the above type having novel and improved characteristics.

Other objects and advantages will be apparent as the nature of the invention is more fully disclosed.

In accordance with the present invention a low friction fiber which is not readily bondable to a resin impregnant is blended with other fibers which are bondable to such resin and felted to form a mat or web which is then resin impregnated and molded and cured to form the bearing element.

In this structure the bondable fibers act as reinforcing elements and as binders to secure the less readily bondable fibers in place in the molded product. However, the latter fibers appear on the surface of the molded member to constitute an anti-friction bearing surface.

The nature of the invention will be better understood by referring to the following description taken in connection with the accompanying drawing in which a specific embodiment has been set forth for purposes of illustration.

In the drawing:

Fig. 1 is a perspective view of a felted web embodying the invention;

Fig. 2 is a similar perspective view of the molded product; and

Fig. 3 is a flow diagram illustrating the steps in the forming method.

The low friction fibers may comprise a polymeric fluorocarbon composition such as tetrafluoroethylene, monochlorotrifluoroethylene resins and fluorothene.

For example, Teflon (tetrafluoroethylene) yarn waste in multifilament form may be chopped up into lengths about ¾" long. These sections of cut yarn are then opened up, so that each individual filament is free.

A blend of these Teflon garnetted filaments is made with bondable fibers such as cotton, Dacron (polyethylene terephthalate) staple fiber or Orlon (polyacrylonitrile) staple fiber, or the like. A suitable mixture is 50% of either one, or 50% Teflon, 25% cotton, 25% Dacron or Orlon. After this blend has been weighed, it is put through a mixing picker to be thoroughly blended.

The blended mixture is then carded as on a standard felting card to form a felted web 10. The web may be advanced continuously in the form of a continuous ribbon of a given width, a given thickness and a given weight, supported on a conveyor if necessary, through a bath of phenolic resin and squeezed to control the amount of resin left in the web, which is then passed into a drier for semi-curing.

The bonding resin may be derived from the reaction product of phenol, cresol or a homologue with formaldehyde under controlled conditions. In the drying step the mixture is heated to remove the solvent and the resin content is polymerized until a residual volatile content of 5% to 7% is attained. The impregnated web thus dried may be stored for subsequent use or may be shipped to a distant point for molding.

For forming the bearing the web may then be molded under heat and pressure into the form of a sheet 15 as shown in Fig. 2. The conversion of the resin into a thermoset form may be accomplished at a temperature of 300° F. to 350° F. for from thirty minutes to sixty minutes at pressures of 10 tons to 100 tons, depending upon the area of the object being molded.

A thrust bearing washer 16 may be stamped from this sheet as indicated in Fig. 2.

Alternatively, after emerging from the drier, the web may be cut or stamped into any desired shape prior to further processing. For example, the web may be die cut into small washers which would then be put in a closed mold and press cured to make a thrust washer, or it may be cut into strips and rolled into a cylindrical form and molded in a cylindrical mold where it is cured under heat and pressure to form a molded tube. This tube may be cut into sections to form cylindrical type bearings. Or the web may be spirally wound into conical shapes for assembling in a series of laminates which may be molded under heat and pressure in such shapes as would be used for spherical bearing rings.

The resin itself is a good bearing surface material. The fibers of cotton, Dacron or Orlon are the reinforcing elements which are bondable and produce the strength needed to hold the Teflon fibers in the matrix. These are the low friction elements which come to the surface in sufficient quantity to produce a bearing surface with very low coefficient of friction which will run without lubrication.

Other resin compositions may also be used as the impregnant, for example, polyvinylchloride or the epoxy resins.

In the case of a liquid, such as polyvinylchloride the mold may be heated to the polymerizing temperature for polyvinylchloride, i.e. 350° F. to 360° F. and immediately cooled to set the resin to solid form with the web embedded therein.

The epoxy resins are thermosetting and may be applied to the mold in the form of a molding powder. The mixture is cured by heating to the proper temperature to convert the resin into the form of a solid body in which the web is embedded.

Although specific embodiments have been set forth for purposes of illustration, it is to be understood that the invention is not to be limited thereto, but it to be construed broadly and restricted solely by the scope of the appended claim.

What is claimed is:

A molded anti-friction thrust bearing comprising a felted web consisting essentially of a blend of 50% of tetrafluoroethylene filaments having a length of ¾" and 50% of fibers selected from the group consisting of cotton, polyethyleneterephthalate staple and tetrafluoroethylene staple, and a rigid thermosetting resin impregnating said felted web, said fibers being bonded to said resin and said tetrafluoroethylene filaments being exposed on the surface of the molded bearing to form the bearing surface and bound into said resin by said fibers bonded to said resin.

References Cited in the file of this patent

UNITED STATES PATENTS

| | | |
|---|---|---|
| 941,605 | Baekeland | Nov. 30, 1909 |
| 2,027,559 | Skillman | Jan. 14, 1936 |
| 2,514,034 | Dean | July 4, 1950 |
| 2,774,128 | Secrist | Dec. 18, 1956 |
| 2,804,886 | White | Sept. 3, 1957 |
| 2,840,881 | Bateman | July 1, 1958 |